(12) United States Patent
Glover et al.

(10) Patent No.: US 9,394,100 B2
(45) Date of Patent: Jul. 19, 2016

(54) PALLET CONTAINER

(75) Inventors: Richard Glover, Hoschton, GA (US);
Dino Lanno, Blacklick, OH (US);
Ronald Price, Rocky Mount, NC (US);
Evan Taylor, Conway, NC (US); Al Hoag, Rocky Mount, NC (US); William F Howard, Halifax, NC (US); Andrew P Scott, Jefferson, GA (US); Richard Rudyk, Meaford (CA); Richard Cooke, Wigston (GB); Markus Schmidt, Kingston Upon Thames (GB)

(73) Assignee: Belron Hungary Kft—Zug Branch, Zug (CH)

( * ) Notice: Subject to any disclaimer, the term of this patent is extended or adjusted under 35 U.S.C. 154(b) by 697 days.

(21) Appl. No.: 13/700,451

(22) PCT Filed: May 26, 2011

(86) PCT No.: PCT/GB2011/050993
§ 371 (c)(1),
(2), (4) Date: Mar. 23, 2013

(87) PCT Pub. No.: WO2011/148180
PCT Pub. Date: Dec. 1, 2011

(65) Prior Publication Data
US 2013/0233811 A1      Sep. 12, 2013

(30) Foreign Application Priority Data
May 28, 2010   (GB) .................................. 1008929.0

(51) Int. Cl.
*B65D 85/48*      (2006.01)
*B65D 19/12*      (2006.01)
(Continued)

(52) U.S. Cl.
CPC ................ *B65D 85/48* (2013.01); *B65D 19/12* (2013.01); *B65D 21/086* (2013.01); *B65D 81/052* (2013.01); *B65G 49/062* (2013.01); *B65D 2519/009* (2013.01); *B65D 2519/00024* (2013.01); *B65D 2519/00059* (2013.01); *B65D 2519/0082* (2013.01); *B65D 2519/0096* (2013.01); *B65D 2519/0097* (2013.01);
(Continued)

(58) Field of Classification Search
CPC ...... B65D 19/44; B65D 81/052; B65D 85/48; B65D 2585/6882
USPC ................ 206/386, 448, 454, 600; 108/55.1; 211/41.14, 49.1, 175, 195, 199, 208; 220/1.5, 4.31, 4.33, 4.34, 6–8
See application file for complete search history.

(56) References Cited

U.S. PATENT DOCUMENTS 2,946,453 A    7/1960  Pityo
2,953,253 A    9/1960  Henderson at al.
(Continued)

FOREIGN PATENT DOCUMENTS

WO      WO 99/30598      6/1999

*Primary Examiner* — Luan K Bui
(74) *Attorney, Agent, or Firm* — Ice Miller LLP

(57) ABSTRACT

A pallet container for holding vehicle windshields for storage, transportation or otherwise, the pallet container comprising a frame structure defining a base, and a periphery, wherein one or more side restraints are provided to be mounted onboard the pallet to inhibit movement of windshields internally of the pallet container, wherein a said side restraint comprises a flexible fluid containing device. In an alternative realization the pallet container is expandable in height and length and/or collapsible by means of opposed pivoted side frames and a connecting frame.

28 Claims, 12 Drawing Sheets

(51) Int. Cl.
  *B65D 21/08* (2006.01)
  *B65D 81/05* (2006.01)
  *B65G 49/06* (2006.01)

(52) U.S. Cl.
  CPC .......... *B65D2519/00164* (2013.01); *B65D 2519/00233* (2013.01); *B65D 2519/00273* (2013.01); *B65D 2519/00293* (2013.01); *B65D 2519/00308* (2013.01); *B65D 2519/00323* (2013.01); *B65D 2519/00338* (2013.01); *B65D 2519/00502* (2013.01); *B65D 2519/00532* (2013.01); *B65D 2519/00562* (2013.01); *B65D 2519/00572* (2013.01); *B65D 2519/00611* (2013.01); *B65D 2519/00631* (2013.01); *B65D 2519/00656* (2013.01); *B65D 2519/00691* (2013.01); *B65D 2519/00761* (2013.01); *B65D 2519/00796* (2013.01); *B65D 2519/00815* (2013.01); *B65D 2585/6882* (2013.01)

(56) References Cited

U.S. PATENT DOCUMENTS

| | | | |
|---|---|---|---|
| 3,147,860 A | 9/1964 | Kean, Sr. et al. | |
| 3,596,755 A | 8/1971 | Bundy et al. | |
| 3,809,234 A | 5/1974 | Kurick | |
| 3,857,494 A * | 12/1974 | Giardini | 108/55.1 |
| 3,955,676 A | 5/1976 | Hansen et al. | |
| 3,961,709 A | 6/1976 | Rowley | |
| 3,963,122 A * | 6/1976 | Pater et al. | 206/448 |
| 3,995,738 A | 12/1976 | Rowley et al. | |
| 4,010,848 A | 3/1977 | Pater et al. | |
| 4,010,849 A | 3/1977 | Pater et al. | |
| 4,033,597 A | 7/1977 | Boyer | |
| 4,086,263 A | 4/1978 | Rowley | |
| 4,093,251 A | 6/1978 | Boyer | |
| 4,186,841 A | 2/1980 | Buckley et al. | |
| 4,202,452 A | 5/1980 | McCormick | |
| 4,465,413 A | 8/1984 | Petren | |
| 4,512,473 A * | 4/1985 | Thomaswick et al. | 206/448 |
| 4,714,169 A * | 12/1987 | Keenan et al. | 220/6 |
| 4,778,064 A | 10/1988 | Gold | |
| 4,899,880 A | 2/1990 | Carter | |
| 5,145,073 A | 9/1992 | Kitagawa et al. | |
| 5,154,310 A | 10/1992 | Massey | |
| 5,439,152 A * | 8/1995 | Campbell | 211/195 |
| 5,465,883 A | 11/1995 | Woodward | |
| 5,603,419 A | 2/1997 | Peterson | |
| 5,641,076 A | 6/1997 | Englund | |
| 5,676,066 A | 10/1997 | Cavalier et al. | |
| 5,711,429 A | 1/1998 | Brown | |
| 5,755,339 A | 5/1998 | Belanger et al. | |
| 5,860,539 A | 1/1999 | Brown | |
| 5,884,778 A | 3/1999 | Freiheit | |
| 6,123,208 A | 9/2000 | Haenszel | |
| 6,247,601 B1 | 6/2001 | Norton et al. | |
| 6,279,763 B1 * | 8/2001 | Bush | 108/55.1 |
| 6,979,037 B2 | 12/2005 | Morrison | |
| 2003/0164318 A1 * | 9/2003 | Lacasse et al. | 206/448 |
| 2004/0222222 A1 * | 11/2004 | Parnall et al. | 220/6 |
| 2005/0040166 A1 * | 2/2005 | Nolet et al. | 220/6 |

\* cited by examiner

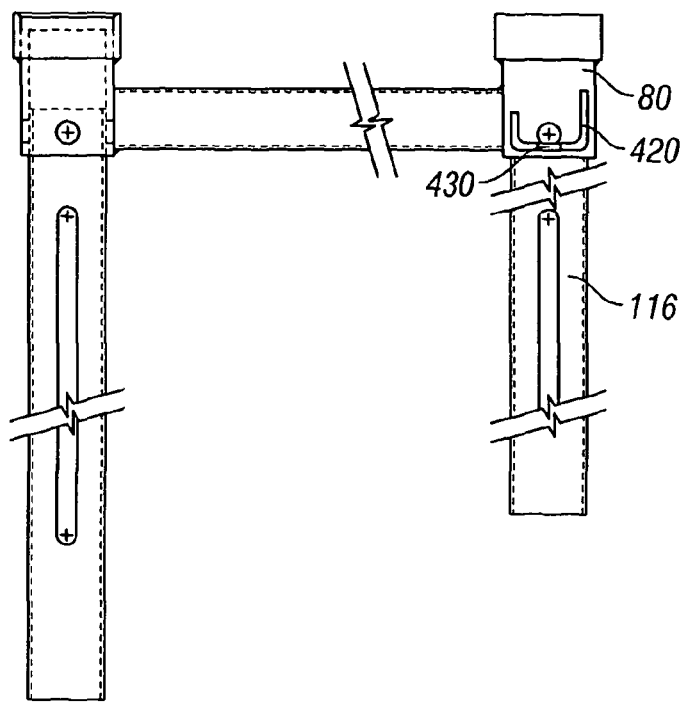
FIG. 9A
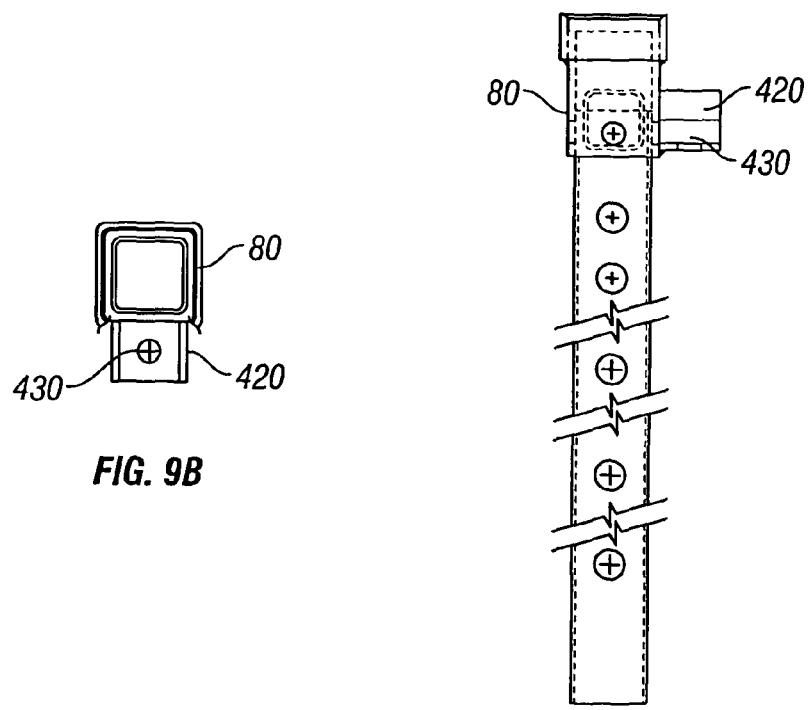
FIG. 9B
FIG. 9C

PALLET CONTAINER

PRIORITY

The present application is related to, claims the priority benefit of, and is a 35 U.S.C. §371 national stage entry of, International Patent Application Serial No. PCT/GB2011/050993, filed May 26, 2011, which is related to and claims the priority benefit of, United Kingdom Intellectual Property Office Patent Application No. GB1008929.0, filed May 28, 2010. The contents of each of these applications are hereby incorporated by reference in their entirety into this disclosure.

BACKGROUND

The present application relates to a container, particularly a re-usable pallet container such as a metal pallet that can be used for packing, storage and shipping of items, particularly fragile items such as vehicle windshields.

A collapsible re-usable windshield pallet for packing storage and shipping of windshields of varying shapes and sizes is disclosed in, for example, U.S. Pat. No. 7,270,236. It has been recognised that it is an advantage to be able to ship windshields of varying sizes in a single container and also to ensure that the container is collapsible to enable return transportation of the container in the collapsed form (when no windshields are being shipped), in order to minimise transport volume and potentially reduce shipping costs. The containers can also be stored in collapsed form in distribution centres and stockists when not being used to contain windshields. U.S. Pat. No. 7,270,236 also identifies the need to use lateral restraints to prevent the windshields moving in the longitudinal direction of the container.

An improved arrangement has now been devised.

SUMMARY

According to a first aspect, the present invention provides a pallet container for holding vehicle windshields for storage, transportation or otherwise, the pallet container comprising a frame structure defining a base, and a periphery, wherein one or more side restraints are provided to be mounted on-board the pallet to inhibit movement of windshields internally of the pallet container, wherein a said side restraint comprises a flexible fluid containing device.

It is preferred that respective flexible fluid containing side restraint devices are positioned at opposed ends of the pallet container.

In one embodiment, the side restraint device comprises an air bag.

The side restraint device is preferably secured to the frame structure of the pallet container.

According to an alternative aspect, the invention provides a pallet container for holding vehicle windshields for storage, transportation or otherwise, the pallet container comprising a frame structure defining a base, and a periphery, wherein the frame structure is expandable from a minimum dimension windshield containing configuration to a maximum dimension windshield containing configuration; wherein in the maximum dimension containing configuration the pallet container is extended in both height and in length when compared to the minimum dimension configuration.

It is preferred that, in addition to being expandable from a minimum dimension windshield containing configuration to a maximum dimension windshield containing configuration; the pallet container is also collapsible from a windshield containing configuration to a stowed configuration not suitable for containing windshields but convenient for transportation or storage of non-used pallet containers.

In a preferred realisation, the pallet container has opposed side frames arranged to be hinged or pivoted to fold down from an erect condition to a collapsed condition.

It is preferred that in the collapsed configuration a plurality of upwardly extending corner stubs are configured to enable other like collapsed pallet containers to be stacked by engagement with the corner stubs.

Beneficially, in the collapsed condition the opposed side frames are positioned laying adjacent the base of the pallet container.

It is preferred that the pallet container has a connecting frame extending between the opposed side frames, the connecting frame arranged to be hinged or pivoted to fold down from an erect condition to a collapsed condition.

In a preferred realisation of the invention, the pallet container has opposed side frames which are extendible in effective length to vary the height of the side frames. The side frames may comprise telescoping side frame elements permitting the height of the pallet container to be varied.

Beneficially, the pallet container frame structure includes connecting frame elements extending in a longitudinal direction of the pallet container to connect the opposed side frames, the connecting frame elements preferably being extendible in effective length to vary the length of the pallet container.

It s preferred that the pallet includes stacking formations enabling like pallets to be stacked one on top of another, preferably in both collapsed and erect configurations.

According to an alternative aspect, the present invention provides a pallet container for holding vehicle windshields for storage, transportation or otherwise, the pallet container comprising a frame structure defining a base, and a periphery, wherein the pallet container is collapsible from a windshield containing configuration to a stowed configuration, and comprises:

opposed side frames arranged to be hinged or pivoted to fold down from an erect condition to a collapsed condition; and, a connecting frame extending between the opposed side frames, the connecting frame arranged to be hinged or pivoted to fold down from an erect condition to a collapsed condition.

It is preferred that the connecting frame and opposed side frames have formations arranged to complementarily engage one another in the pallet container erected configuration and be releasable to disengage permitting re-orientation to the collapsed configuration.

According to an alternative aspect, the invention provides a side restraint system for a pallet container for holding vehicle windshields for storage, transportation or otherwise, the side restraints system comprising one or more flexible fluid containing devices mounted on-board the pallet to inhibit movement of the windshields.

BRIEF DESCRIPTION OF DRAWINGS

The invention will now be described in a specific embodiment, by way of example only, and with reference to the accompanying drawings, in which

FIGS. 9A to 9C are end, plan and side views respectively showing the seat 420 attached to the boss 80 for receiving the tube frames 310, 320.

DESCRIPTION

Figure 1:
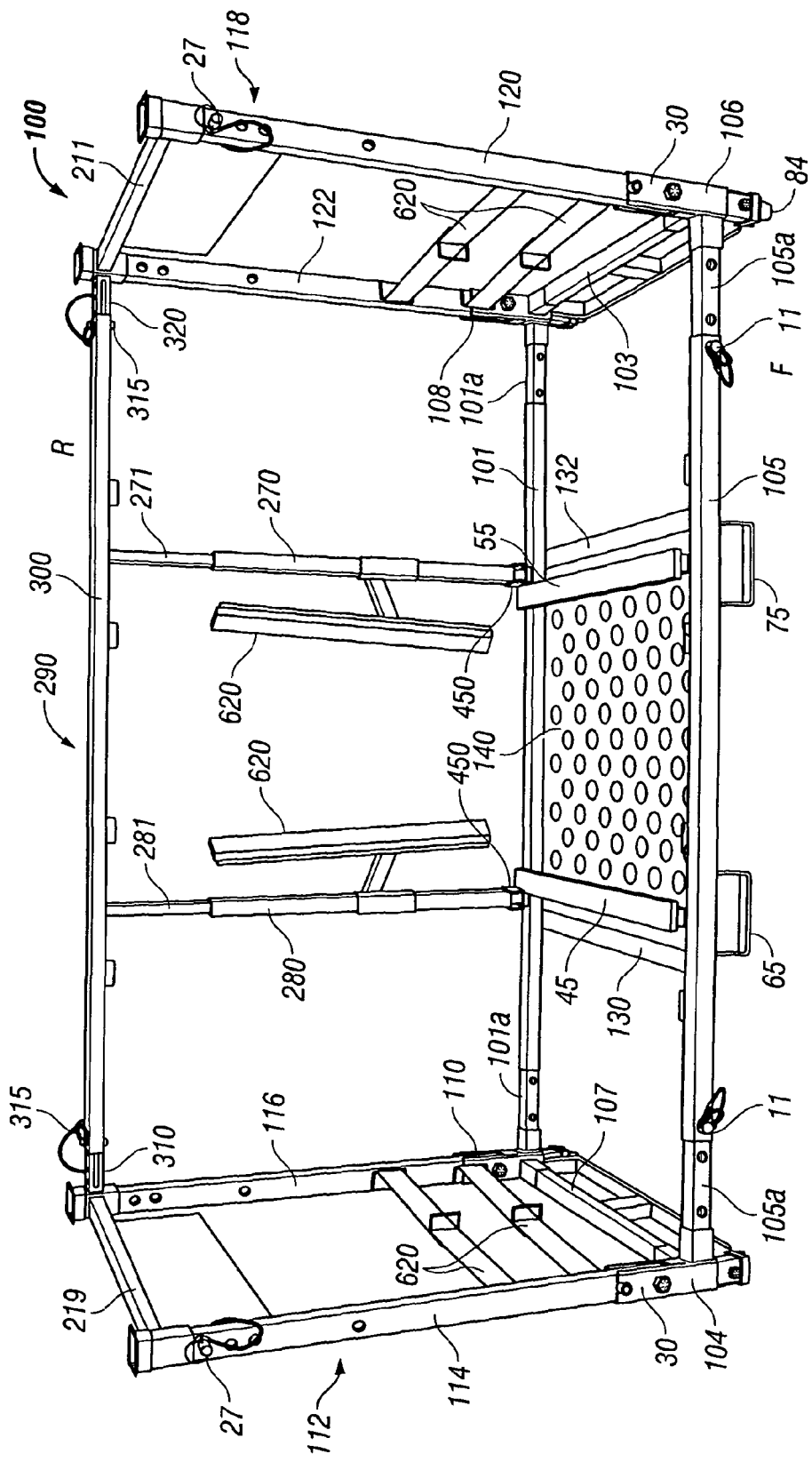
FIG. 1 is a perspective view from the front of a pallet container in accordance with the invention.
Figure 2:
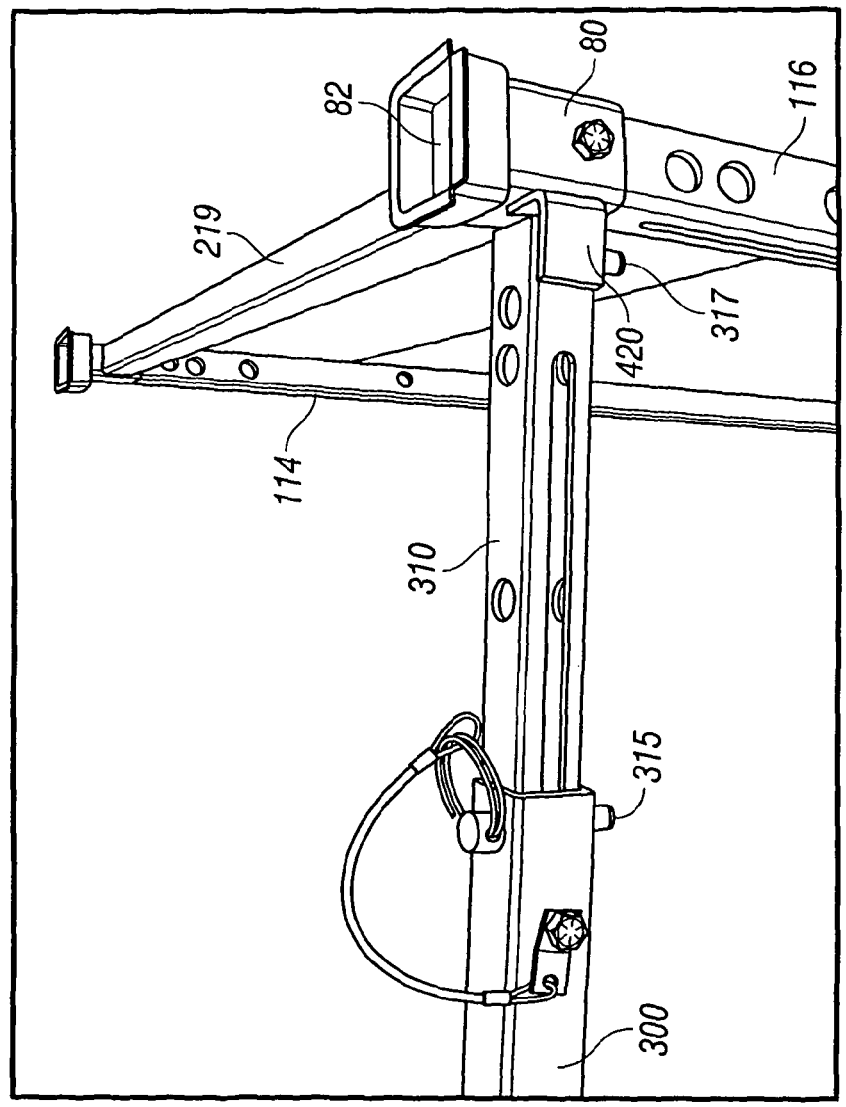
FIG. 2 is a perspective view of the upper rear cross frame connecting to the side frame.
Figure 3:
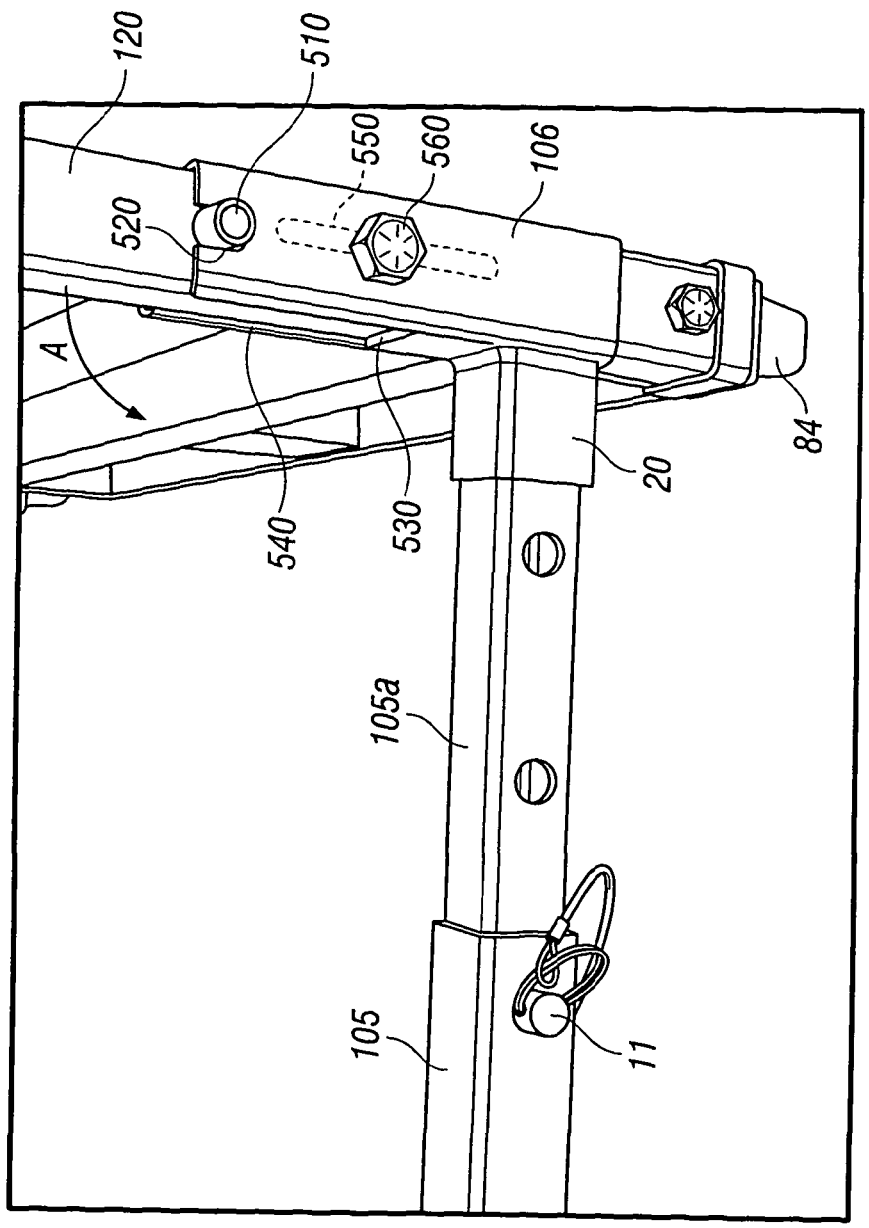
FIG. 3 is a perspective view of the connection to a side frame stub of the forward lower cross frame.
Figure 4:
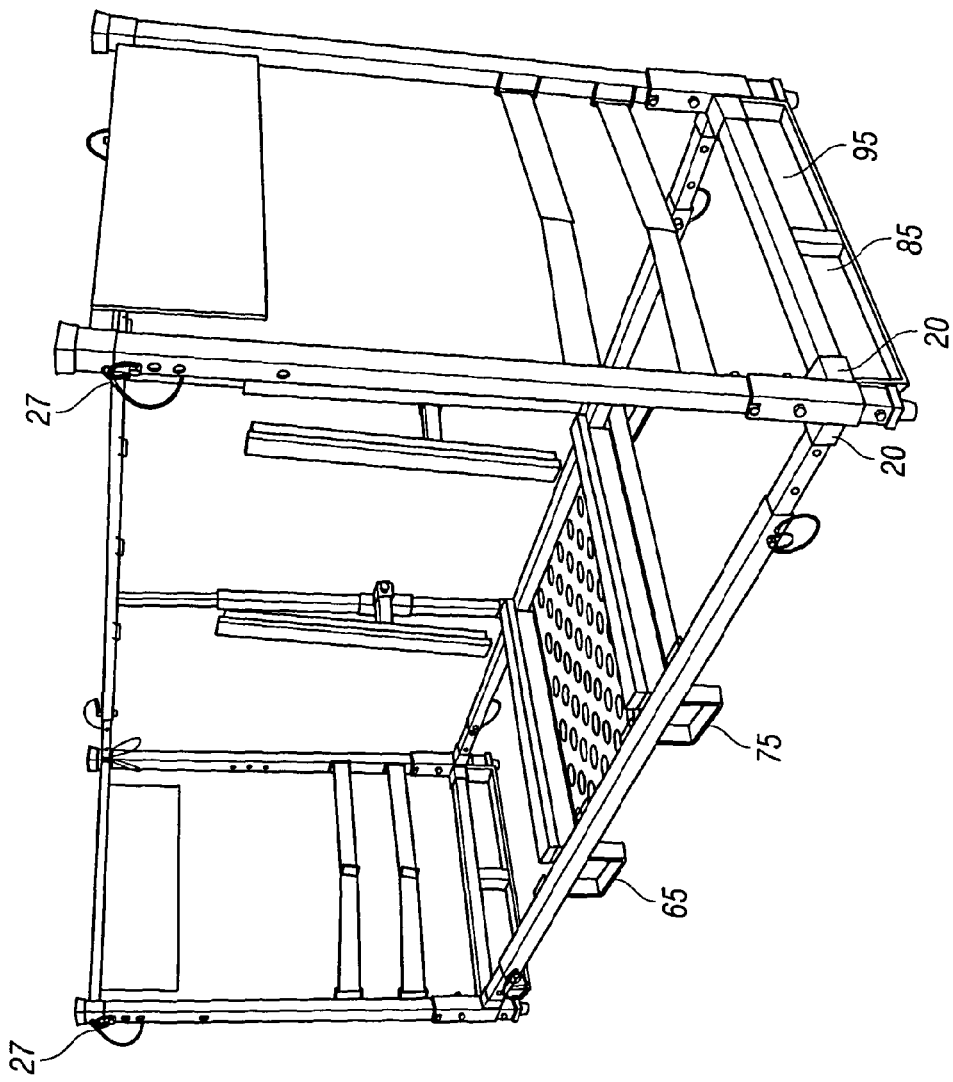
FIG. 4 is a perspective view from an end of the pallet container.
Figure 5:
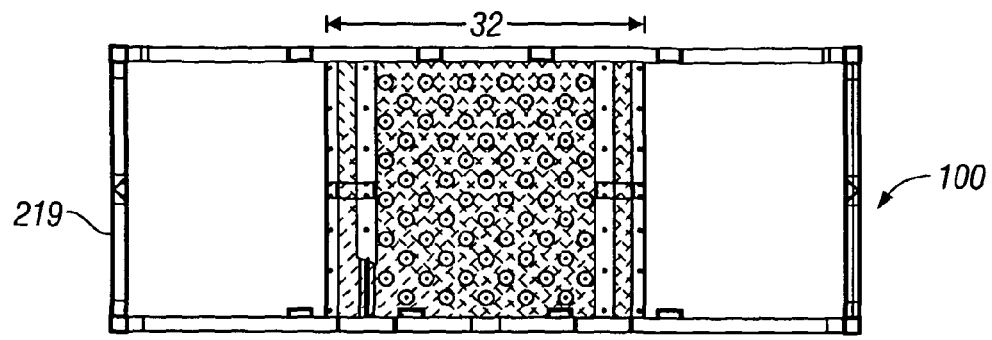
FIG. 5 is a plan view of the pallet container.

Referring to FIGS. 1 to 4, there is shown an embodiment of the invention comprising a steel frame pallet 100. The front of the pallet is indicated by the letter F. The rear of the pallet is indicated by the letter R. The frame comprises frame lengths 101 103, 105 and 107 arranged in a substantially rectangular configuration and connecting with corner stubs 104, 106, 108, 110. The forward frame length 105 and the rear frame length 101 are extendible and contractible in effective length by means of end lengths 101*a* 105*a* which are received in the main tubular frame length 101 105 telescopically. Quick release locking pins 11 are provided to cooperate with aligning holes in the frame lengths to secure the frame lengths at the appropriate selected length. This is shown most clearly in FIG. 6. This configuration enables the overall length of the container pallet to be altered dependent upon specific requirements.

The corner stubs 104, 106, 108, 110 are provided with sockets 20 for receiving either the end lengths 101*a* 105*a* or the ends of the side frame lengths 103 107. Side frame 112 comprises post 114 and post 116. Post 114 and post 116 are engaged in upward facing sockets 30 of the respective stubs 104 and 110. Side frame 118 comprises posts 120 and 122. Posts 120 and 122 are similarly engaged in the sockets 30 of respective stubs 106 and 108. A rear upper frame length extends to connect posts 116 and 122 as will be described in detail later.

The frame further comprises transverse bracing steel members 130 132 extending transversely at the base of the structure welded to and connecting the forward and rear frame lengths 105 101. A support plate 140 is also provided, extending transversely at the base of the structure welded to and connecting the forward and rear frame lengths 105 101. Furthermore a pair of slider bars 45, 55 are welded to and connect the forward and rear frame lengths 105 101 extending transversely across the base. These have respective upper surfaces raised above the level of the plate 140 and bracing members 130 132. In use, the windshields loaded onto the pallet container 100 rest with their lower edges supported on the slider bars 45 55. The slider bars, as the name suggests, facilitate sliding of the windshields into or out of the loaded position.

The forward and rear frame lengths 105, 101 are provided with aligned brackets 65 75 to receive the tines of a respective fork-lift truck. Both opposed side frame members 103 107 are also provided with brackets 85, 95 for receiving the tines of a respective fork-lift truck, The pallet can therefore be lifted by a fork-lift truck approaching or positioned at any side of the container pallet.

In addition to being adjustable in length, the pallet container is also adjustable in height. The upright posts 114 116 122 and 120 of the side frames 112 118 comprise inner frame tubes received telescopically internally of the outer posts 114 116 122 120, In the configuration shown in FIGS. 1 to 4, the container is shown in its 'least height' configuration in which the inner frame tubes are completely retracted into the outer posts 114 116 122 120. The inner tubes are inserted into the open upper ends of the corner posts 114 116 122 120, and connected to end bosses 80. The side frame 118 is provided with an upper side frame member 211 welded at opposed ends to the bosses 80 of the inner tube members inserted into posts 120 122. The side frame 112 is provided with an upper side frame member 219 welded at opposed ends to the bosses 80 of the inner tube members inserted into posts 116 114. In order to increase the height of the pallet container 100, the respective upper side frame member 211 219 is raised such that the respective inner tube member is simultaneously drawn out of the respective post 114 116 122 120. The telescopically extended inner tube frame members are then secured relative to the respective post 114 116 122 120 by means of a locking pin 27 passing through co-aligned holes in the inner tube frame members and the posts 114 116 122 120.

In addition to being adjustable in length and height, the pallet container is also configured to be stackable, and more than this, stackable in different length and height configurations. In order to achieve this receiving sockets 82 are secured to the bosses 80 shaped and configured to snugly receive foot stops 84 provided on the underside of the corner stubs 104, 106, 108, 110, when one container is stacked on top of another.

Figures 10A, 10B:
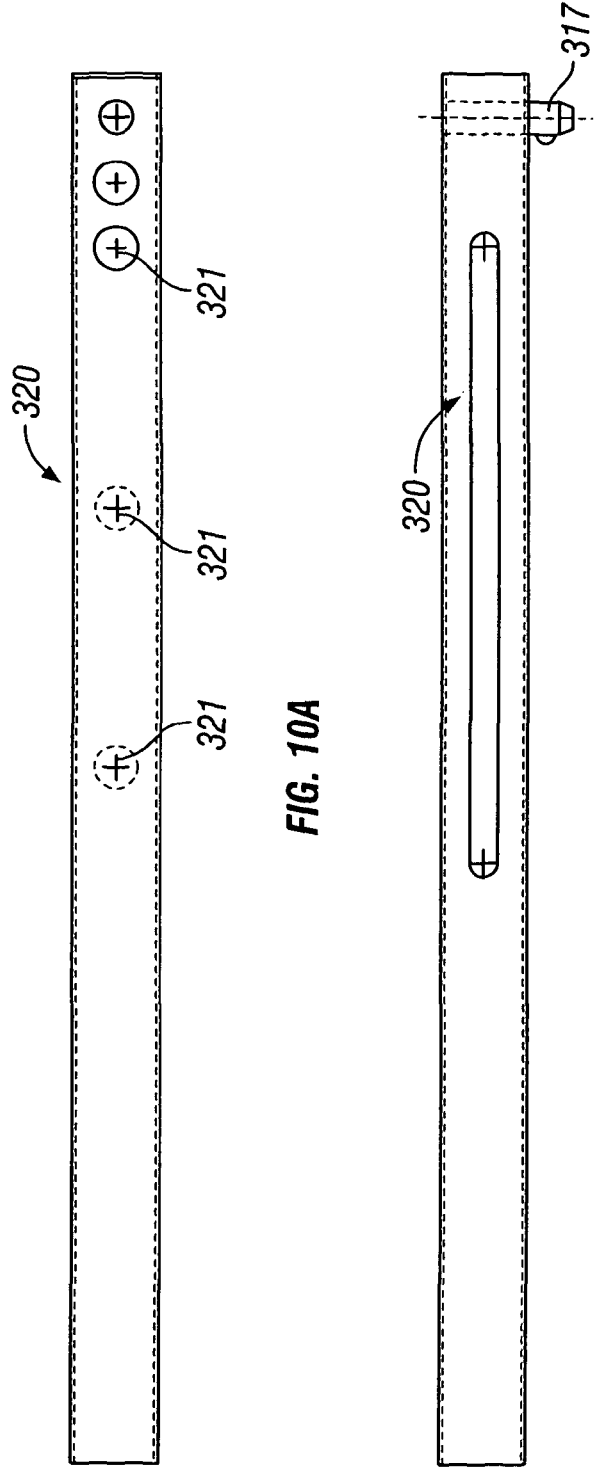
FIGS. 10A and 10B are plan and side views of a tube frame 320.
Figure 11:
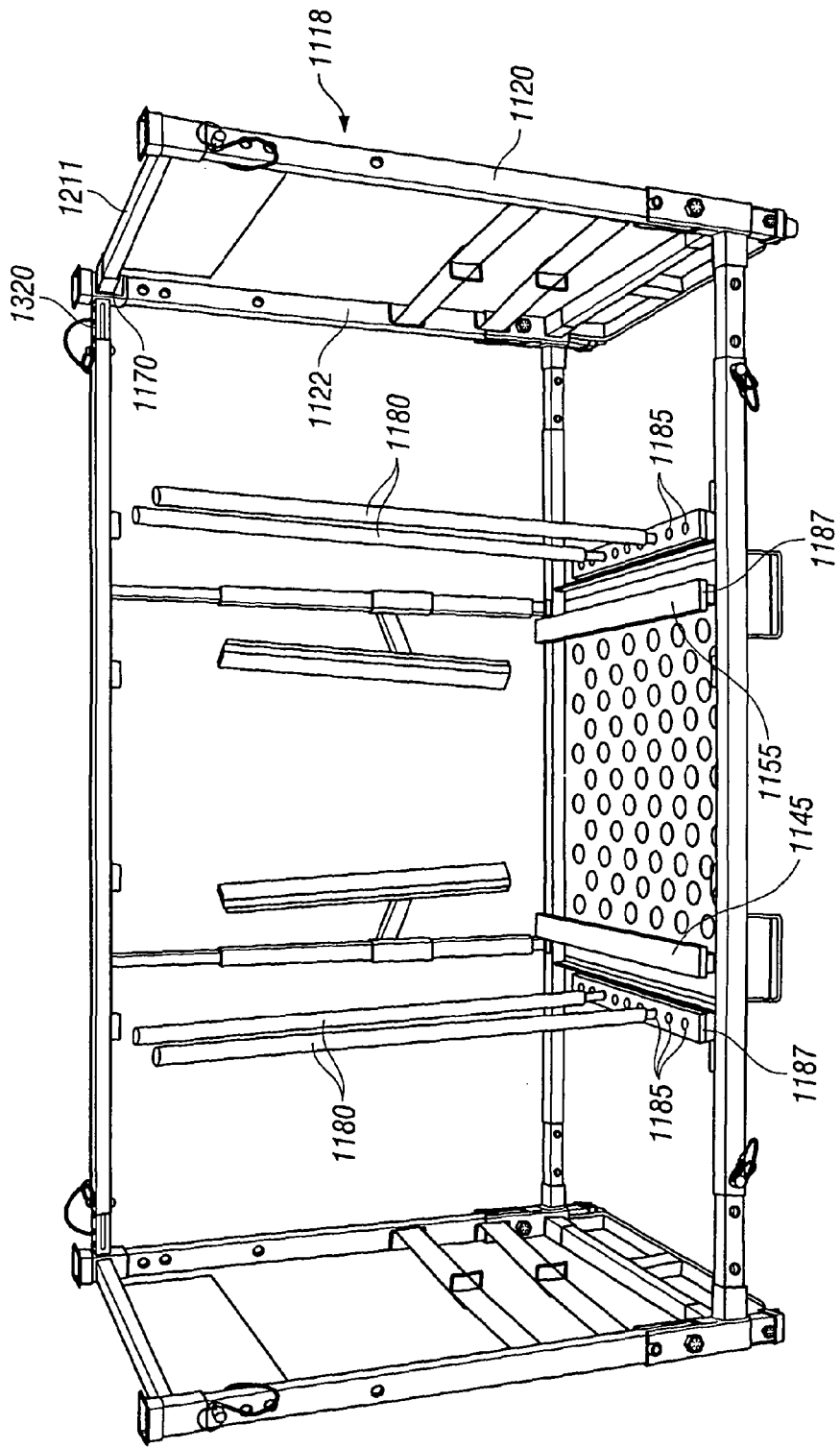
FIG. 11 is a perspective view from the front of a pallet container in accordance with the an alternative embodiment of pallet container in accordance with the invention.

The pallet container is, in addition to the end frames 112 118, also provided with a rear frame 290 comprising a pair of posts 270, 280 within which are telescopically received frame struts 271, 281 welded connected to a tubular frame cross member 300. The cross member 300 is thus height adjustable with the rest of the pallet container 100 as the frame struts 271, 281 move telescopically in the posts 270 280. The effective length of the cross member 300 is also adjustable as inner frame tubes 310 320 are telescopically received in the opposed ends of the cross member 300. The inner frame tube 320 is shown in detail in FIGS. 10A and 10B. The upper surface of the inner frame tubes 310, 320 is provided with a series of spaced apertures 321 which are arranged to line up with one of respective locking apertures provided at opposed ends of the cross member 300 to be secured with a respective locking pin 315. This fixes the cross member 300 effective length to the required extent. As shown most clearly in FIG. 10B, the end of the inner frame tubes 310 320 are provided with a downwardly extending securing pin 317. The securing pin 317 locates in an aperture 430 provided in a receiving seat 420 welded to the bosses 80 of the inner tube members inserted into posts 116 and 122.

The posts 270, 280 of the rear frame 290 are pivotally mounted at their lower ends to the frame member 101. Pivotal mounting brackets 450 are provided for this purpose. In use, the rear frame member is held in the upright position at the desired height and length extension, by means of engagement of the securing pins 317 in the apertures 430, with the ends of the inner frame tubes 310, 320 seated in the seats 420. This is the configuration shown in FIGS. 1 2 4 6 and 7. In order to stow the pallet container 100 when empty (for example for storage or transportation when not loaded with windshields), the rear frame can be pivoted to a stowed orientation in which the posts 270 280 are pivoted about the pivot mounting brackets 450 through ninety degrees such that the posts 270 280 lie flat across the base of the container pallet 100 between the rear and front frame lengths 101 105. In order to do this the securing pins 317 are lifted out of engagement of the apertures 430, as the ends of the inner frame tubes 310, 320 are lifted from being seated in the seats 420, The cross member 300 is then lowered such that the struts 271, 281 move telescopically to be received completely back into the posts 270 280, The rear frame can then be pivoted to the lowered/collapsed position such that the cross member 300 lies contiguous against the forward frame length 105.

The opposed side frames 112 and 118 are also pivotally mounted to be collapsible from their upright orientation to lie flat adjacent the base of the pallet container. This is achieved in a similar manner to the arrangement described in U.S. Pat. No. 7,270,236, The lower ends of posts 114 116 120 122 are received in the stubs 104 110 108 106. The operation will be described in respect of the post 120 received in the stub 106 and shown most clearly in FIG. 3. The other posts of the end frames are received and operate in the same manner. The post 120 in the upright orientation is seated to rest in the post such that a lug 510 is seated in a recess 520 formed on the upper edge of the stub 106. The lower end of the post 120 extends down below the lip 530 defined at the bottom of an open channel 540 defined in the stub 106, the lower end of the post 120 is provided with a respective longitudinal slot 550 provided in opposed sides, a pivot bolt 560 extends through the stub from one side to the other passing through the slots 550 in the opposed sides of the post 120.

Figure 8:
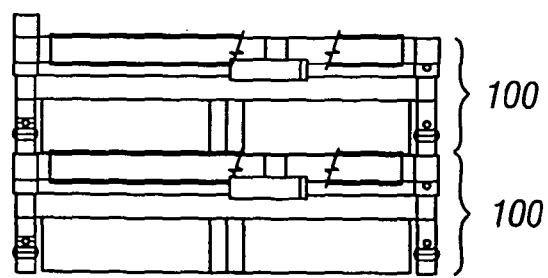
FIG. 8 is an end view showing two collapsed pallet containers stacked one on top of another.

In order to pivot the post 120 from its upright orientation, the post is first lifted upwardly such that the lug 510 is lifted out of the recess 520 and the bottom of the post is clear of the lip 530. The post is then pivoted about the pivot bolt 560 in the direction of arrow A in FIG. 3, in order to extend through the open channel 540 in the stub 106. The respective side frames 112 118 pivot to collapse flat against the already collapsed rear frame 290. In the collapsed configuration the collapsed pallet containers can be sacked one on top of another. This is shown in FIG. 8, in which two collapsed pallets are shown one stacked on top of the other. The feet 64 of the upper pallet container engage in the seats formed by the upper open ends of the stubs 104 106 108 110 of the lower pallet container.

Therefore, in addition to being adjustable in length and height, and stackable in its upright configuration, the pallet container is also collapsible from its 'in use' condition, to a collapsed condition in which collapsed containers can also be stacked one on top of another. The pallets can therefore be stacked in both the erect and the collapsed configurations.

The posts 270, 280 of the rear frame 290 are provided with respective rests 620 which are mounted to the posts 270 280. The purpose of the rests 620 is to support the windshield array when secured in the container. In the embodiment shown the rests 620 are movable by rotating about the axis of the posts 270 280 between an 'in use' position shown in FIG. 4 (projecting into the container) and a stowed position swung to a position permitting collapsing and stacking. As a less preferred alternative the rests 620 could be removable from the posts 270 280.

In the embodiment shown in the drawings, the front of the container is open and there is no front restraint. In such an embodiment the windshield array contained in the container is secured by means of a straps or tethers secured to the rear frame 290 at the cross member 300, passing over the windshield array and secured to the bottom front frame length 105.

Figure 6:
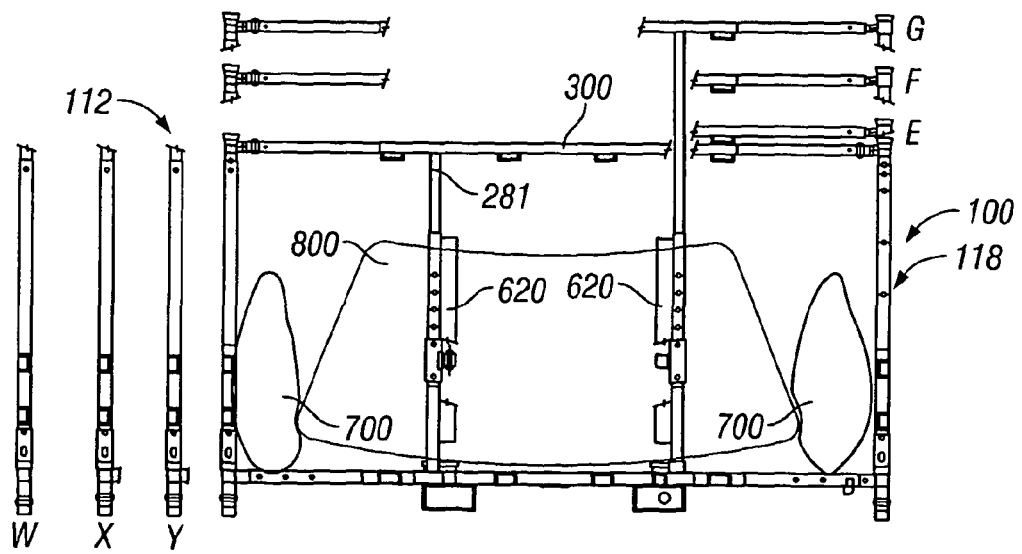
FIG. 6 is a side view of the pallet container showing the ability to vary the size of the pallet container in the erected condition.
Figure 7:
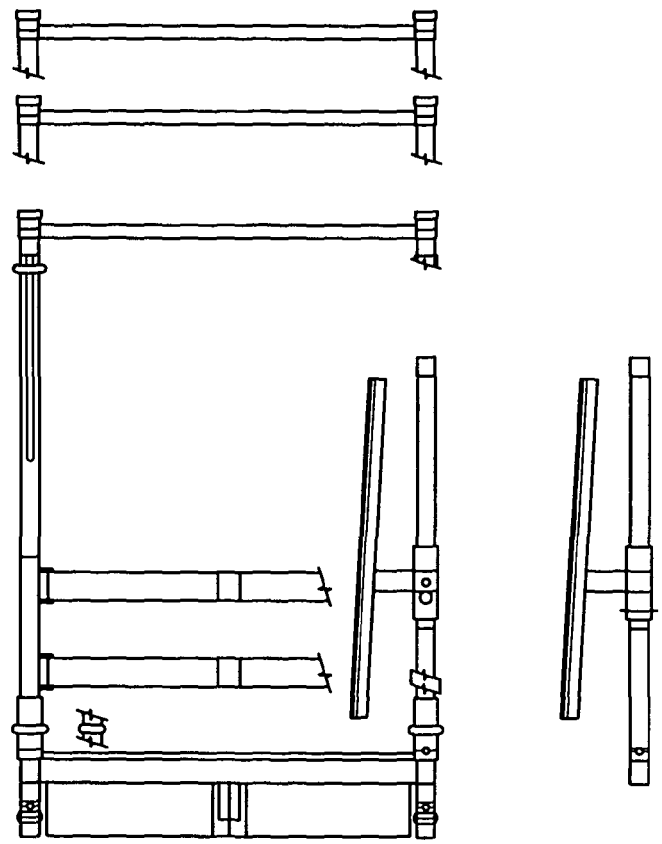
FIG. 7 is an end view of the pallet container.

It is important to provide side restraints to prevent the windshields shifting in the longitudinal direction of the container during transit. In U.S. Pat. No. 7,270,236 this is achieved by means of pivoting bar side restraints. Conveniently and beneficially according to preferred aspects of the present invention, and as shown in FIG. 6, the side restraints comprise flexible fluid containing devices such as inflatable air bags 700. The bags can be secured to the frame by means of attachment to straps 620. The bags can be inflated prior to being forced into position to pack the windshield array 800. Alternatively the bags can be inflated subsequently to being positioned adjacent the windshield array 800. By using side restraints comprising flexible fluid containing devices such as inflatable air bags 700, the extra weight and bulk associated side restraints such as the pivoting bar side restraints of U.S. Pat. No. 7,270,236 can be avoided. This can reduce shipping and storage costs. Configuring the pallet containers for use is also less time consuming as a result of using side restraints comprising flexible fluid containing devices such as inflatable air bags 700.

As shown in FIG. 6, the pallet container 100 is extremely versatile in that it can be expanded lengthwise from a minimum length to extended lengths W X Y, and also in terms of its height from a minimum height to extended heights E F G. The pallet container can also be collapsed to an extremely compact configuration in which the back frame 290 remains integrally connected in the collapsed configuration such that collapsing and erection of the unit is conveniently achieved.

Referring now to FIGS. 11 to 14, there is shown an alternative embodiment of pallet container which is generally similar in construction to the pallet container 100 of the preceding figures, but in which adaptations have been made to facilitate ease of loading in certain situations.

The pallet container of the first described embodiment is primarily designed to be loaded from the front open side F. In certain situations it may be desirable to load from one of the opposed side ends of the container. Accordingly, the embodiment of FIGS. 11 to 14 is designed to achieve this effect by making the upper side frame member 1211 of the side frame 1118 effectively detachable or displaceable in order to permit access though the side frame 1118.

Figure 12:
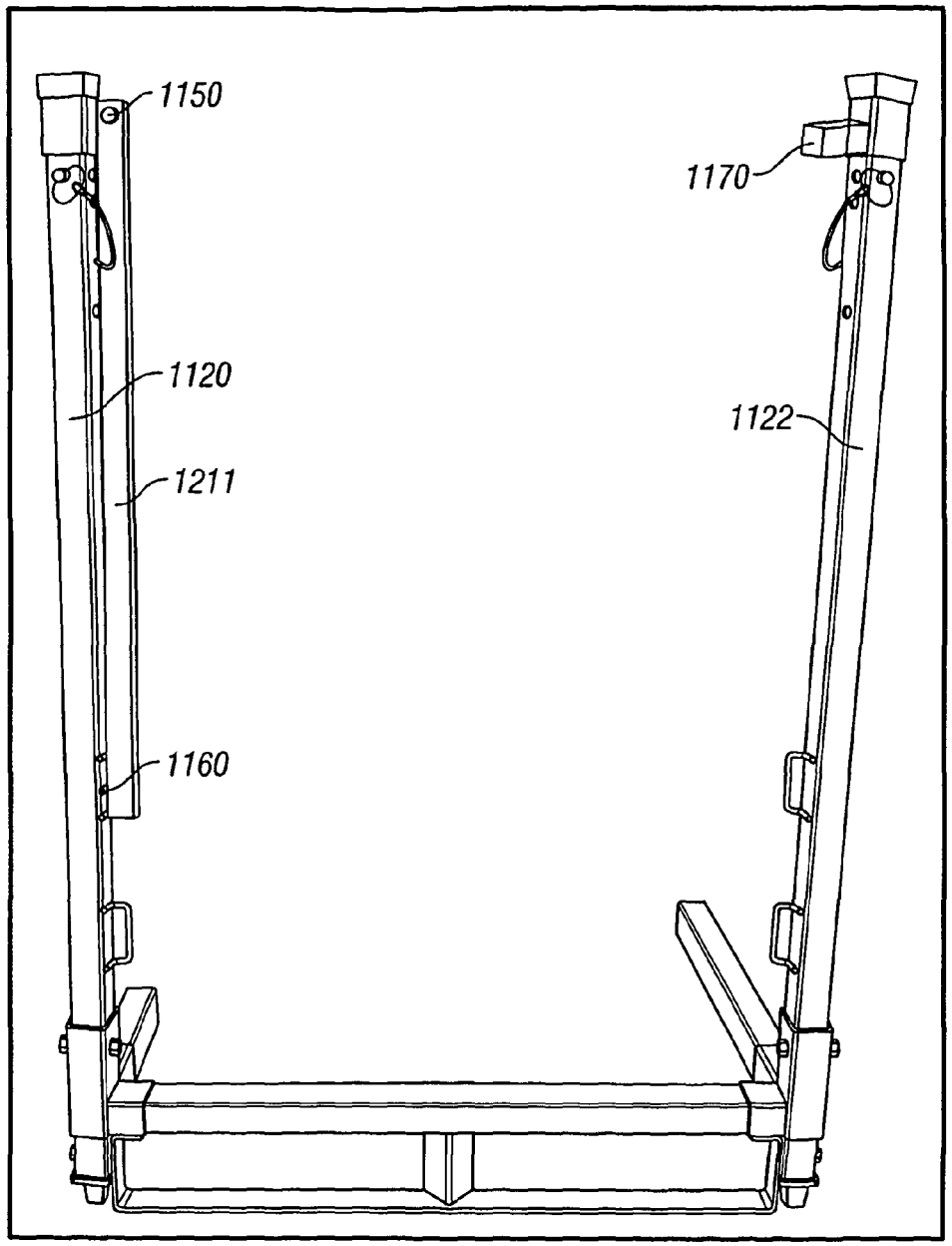
FIG. 12 is a side end view of the embodiment of FIG. 11.
Figure 13:
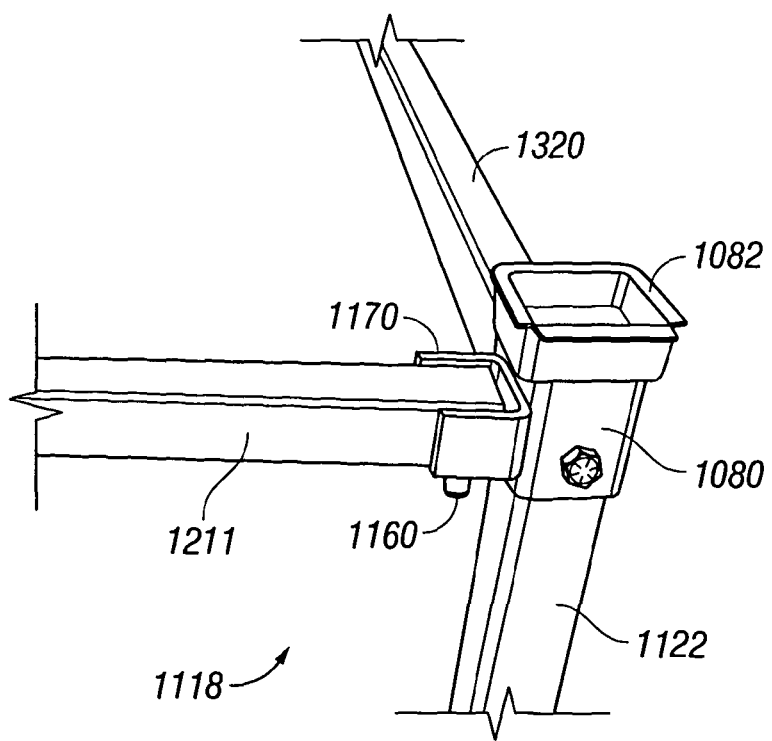
FIG. 13 is a detail view of the side end frame of FIG. 12.
Figure 14:
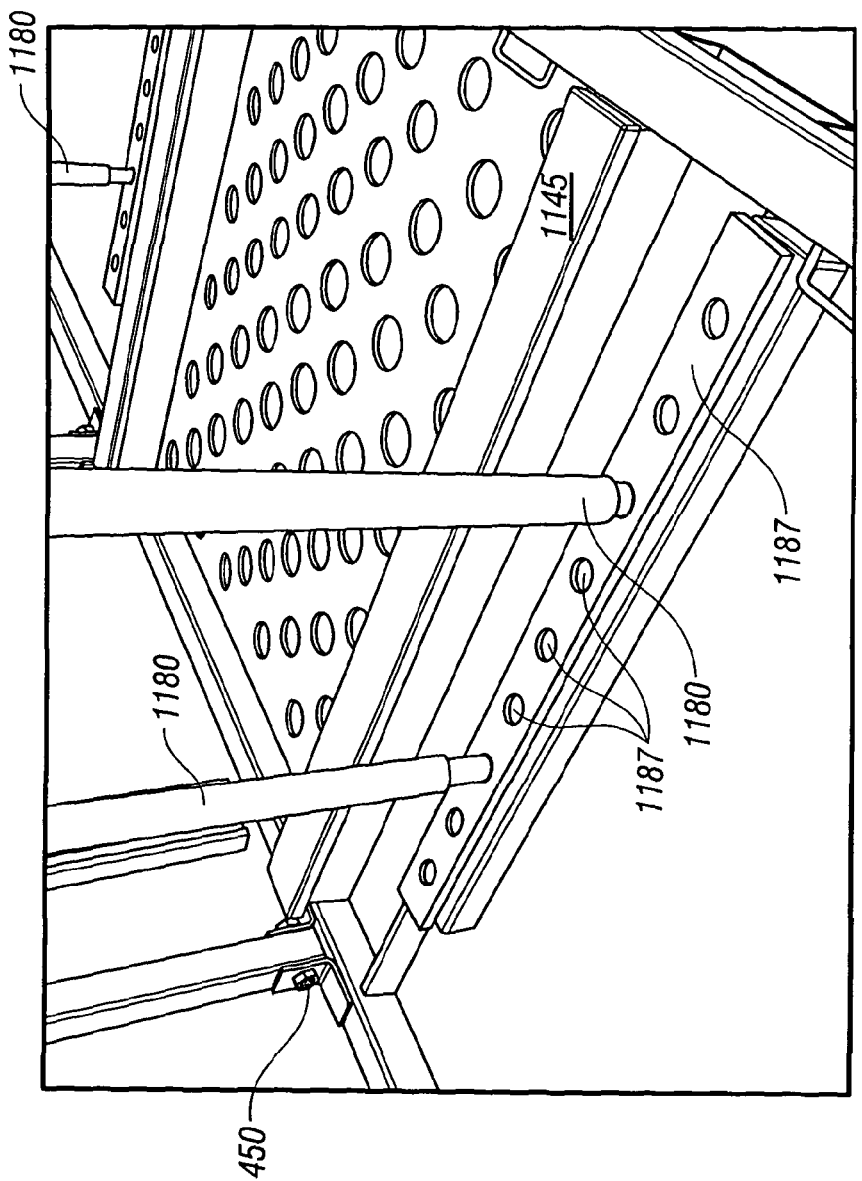
FIG. 14 is perspective detailed view of a part of the container showing an adaption for aiding loading of the pallet container.

The upper side frame member 1211 is attached at one end to the upright post 1120 by means of a hinge structure 1150. The other end of the upper side frame member 1211 is provided with a location pin 1160 provided on the underside of the upper side frame member 1211. The purpose of the locator pin is to locate in a locating aperture provided in the base of a locator bracket 1170. The locator bracket has U shaped sidewalls extending upwardly from the base to provide a secure location seat for the end of the upper side frame member 1211. In order to displace the upper side frame member 1211 from its bracing position, the upper side frame member 1211 is pivoted upwardly on the hinge structure 1150 enabling the opposed end to be lifted clear of the locator bracket 1170. The upper side frame member 1211 is then lowered pivotally about the hinge to rest in the position shown in FIG. 12. There is sufficient play in the hinge structure 1150 to ensure that the free end of the upper side frame member 1211 can be displaced sideways to clear the locator bracket as the upper side frame member 1211 is lowered. In the displaced or lowered position (as shown in FIG. 12) the upper side frame member 1211 ma be secured to the upright 1120. For example the locator pin may engage in a securing formation provided on the upright post 1120.

The embodiment of FIGS. 11 to 14 includes a further modification when compared to the embodiment of FIGS. 1 to 10. In this embodiment, poles 1180 can be positioned in an upright orientation in the interior of the pallet container. The poles enable the interior of the pallet container to be divided up into sections and windshields positioned in the different sections supported and divided by the poles 1180. The poles 1180 are push fit inserted into respective ones of a series of spaced receiving sockets 1185 positioned along respective tracks 1187 which extend at the base of the pallet container from the front frame length 1105 toward the rear of the container, and spaced outwardly of a respective slider bar 1145 1155.

The location of the ends of the poles 1180 in the location sockets 1185 is sufficient to ensure that the poles are secured with sufficient robustness, however when the pallet container has been loaded it is possible to remove the poles 1180 from the receiving sockets by simply pulling upwardly to free the ends from the receiving sockets 1185. The poles 1180 locating in the sockets 1185 effectively provide a temporary or removable dividing structure for dividing up the interior of the pallet into loading zones.

The invention claimed is:

1. A pallet container for holding vehicle windshields for storage, transportation or otherwise, the pallet container comprising: a frame structure defining a base, and a periphery, wherein the frame structure is collapsible from a windshiled containing configuration to a stowed configuration, and is also expandable from a minimum dimension windshield containing configuration to a maximum dimension windshield containing configuration, wherein in the maximum dimension windshield containing configuration the frame structure is extended in both height and in length when compared to the minimum dimension windshield containing configuration; opposed side frames arranged to be hinged or pivoted to fold down from an erect condition to a collapsed condition; and a connecting frame extending between the opposed side frames, the connecting frame having connecting frame members telescoping in both length and height and being hinged or pivoted to fold down from an erect condition to a collapsed condition.

2. A pallet container according to claim 1, wherein when the pallet container is in the collapsed condition the opposed side frames are positioned laying adjacent the base of the pallet container.

3. A pallet container according to claim 1, wherein the opposed side frames are extendible in effective length to vary a height of the side frames.

4. A pallet container according to claim 3, wherein the side frames comprise telescoping side frame elements.

5. A pallet container according to claim 3, wherein connecting frame elements extend in a longitudinal direction of the pallet container to connect the opposed side frames, wherein the connecting frame elements are extendible in effective length to vary a length of the pallet container.

6. A pallet container according to claim 1, wherein the pallet container comprises stacking formations enabling like pallet containers to be stacked one on top of one another.

7. A pallet container according to claim 1, further comprising one or more side restraints that are mounted on-board the pallet container to inhibit movement of windshields internally of the pallet container, wherein at least one said side restraint comprises a flexible fluid containing device.

8. A pallet container according to claim 2, wherein the opposed side frames are extendible in effective length to vary the height of the side frames.

9. A pallet container according to claim 8, wherein the side frames comprise telescoping side frame elements.

10. A pallet container according to claim 9, wherein the connection frame members extend in a longitudinal direction of the pallet container to connect the opposed side frames, wherein the connecting frame elements are extendible in effective length to vary the length of the pallet container.

11. A pallet container according to claim 2, wherein the pallet container includes stacking formations enabling like pallet containers to be stacked one on top of another.

12. A pallet container according to claim 3, wherein the pallet container includes stacking formations enabling like pallet containers to be stacked one on top of another.

13. A pallet container according to claim 4, wherein the pallet container includes stacking formations enabling like pallet containers to be stacked one on top of another.

14. A pallet container according to claim 5, wherein the pallet container includes stacking formations enabling like pallet containers to be stacked one on top of another.

15. A pallet container according to claim 2, wherein one or more side restraints are provided mounted on-board the pallet container to inhibit movement of windshields internally of the pallet container, wherein at least one of said one or more side restraint comprises a flexible fluid containing device.

16. A pallet container according to claim 3, wherein one or more side restraints are provided mounted on-board the pallet container to inhibit movement of windshields internally of the pallet container, wherein at least one of said one or more side restraint comprises a flexible fluid containing device.

17. A pallet container according to claim 4, wherein one or more side restraints are provided mounted on-board the pallet container to inhibit movement of windshields internally of the pallet container, wherein at least one of said one or more side restraint comprises a flexible fluid containing device.

18. A pallet container according to claim 5, wherein one or more side restraints are provided mounted on-board the pallet container to inhibit movement of windshields internally of the pallet container, wherein at least one of said one or more side restraint comprises a flexible fluid containing device.

19. A pallet container according to claim 6, wherein one or more side restraints are provided mounted on-board the pallet container to inhibit movement of windshields internally of the pallet container, wherein at least one of said one or more side restraint comprises a flexible fluid containing device.

20. A pallet container for holding vehicle windshields for storage, transportation or otherwise, the pallet container comprising a frame structure defining a base, and a periphery, wherein the pallet container is collapsible from a windshield containing configuration to a stowed configuration, and comprises:
   opposed side frames arranged to be hinged or pivoted to fold down from an erect condition to a collapsed condition, the opposed side frames having frame members telescoping in both length and height; and
   a connecting frame extending between the opposed side frames, the connecting frame having frame members telescoping in both length and height, the connecting frame arranged to be hinged or pivoted to fold down from an erect condition to a collapsed condition.

21. A pallet container according to claim 20, wherein in the collapsed condition the opposed side frames and the connecting frame are positioned laying adjacent the base of the pallet container.

22. A pallet container according to claim 20, wherein the connecting frame and the opposed side frames have formations arranged to complementarily engage one another in the pallet container erected condition and be releasable to disengage permitting re-orientation to the collapsed condition.

23. A pallet container according to claim 20, wherein the pallet container is loadable from an elongate front side of the pallet container and an end side of the pallet container.

24. A pallet container according to claim 23, further comprising a side frame member, wherein the side frame member is de-mountable or displaceable from a position extending across the end side of the pallet container such that when de-mounted or displaced access to load or unload the pallet container is facilitated via the end side of the pallet container.

25. A pallet container according to claim 24, wherein the side frame members are hinge mounted.

26. A pallet container according to claim 20, wherein the pallet container includes a removable dividing structure for dividing up the interior of the pallet container into loading zones.

27. A pallet container according to claim 26, wherein the removable dividing structure comprises one or more upright dividers located in one or more receiving formations provided proximate the base of the pallet container.

28. A pallet container according to claim 27, wherein at least one of the one or more upright dividers comprises a pole.

* * * * *